United States Patent
Brendel et al.

(10) Patent No.: US 11,689,864 B2
(45) Date of Patent: Jun. 27, 2023

(54) HEARING DEVICE AND METHOD OF OPERATING THE HEARING DEVICE

(71) Applicant: Sivantos Pte. Ltd., Singapore (SG)

(72) Inventors: Johannes Brendel, Erlangen (DE); Gerhard Pfannenmueller, Fuerth (DE); Ulrich Schaetzle, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/579,021

(22) Filed: Jan. 19, 2022

(65) Prior Publication Data

US 2022/0240024 A1    Jul. 28, 2022

(30) Foreign Application Priority Data

Jan. 25, 2021 (DE) ................. 10 2021 200 642.6

(51) Int. Cl.
*H04R 25/02* (2006.01)

(52) U.S. Cl.
CPC ......... *H04R 25/02* (2013.01); *H04R 2460/03* (2013.01)

(58) Field of Classification Search
CPC ............................ H04R 25/02; H04R 2460/03
See application file for complete search history.

(56) References Cited

U.S. PATENT DOCUMENTS

| | | | |
|---|---|---|---|
| 4,681,111 A | 7/1987 | Silvian | |
| 5,276,910 A | 1/1994 | Buchele | |
| 5,774,791 A | 6/1998 | Strohallen et al. | |
| 8,224,003 B2 | 7/2012 | Reithinger | |
| 8,417,195 B2 | 4/2013 | Murdoch | |
| 2015/0312684 A1* | 10/2015 | Knudsen | H04L 25/03343 381/23.1 |
| 2021/0377678 A1 | 12/2021 | Gottschalk et al. | |

FOREIGN PATENT DOCUMENTS

| | | |
|---|---|---|
| DE | 69534704 T2 | 9/2006 |
| DE | 102007018121 A1 | 10/2008 |
| DE | 102007051307 A1 | 4/2009 |
| DE | 102019207680 B3 | 10/2020 |
| WO | 2007030864 A1 | 3/2007 |

* cited by examiner

*Primary Examiner* — Andrew L Sniezek
(74) *Attorney, Agent, or Firm* — Laurence A. Greenberg; Werner H. Sterner; Ralph E. Locher

(57) ABSTRACT

A hearing device, in particular hearing aid, contains a transmitter circuit for wireless signal transmission. The transmitter circuit contains an electrical resonant circuit having at least one controllable semiconductor switch, at least one capacitor and a transmitter coil. The at least one semiconductor switch is driven by a pulse phase modulator.

12 Claims, 6 Drawing Sheets

HEARING DEVICE AND METHOD OF OPERATING THE HEARING DEVICE

CROSS-REFERENCE TO RELATED APPLICATION

This application claims the priority, under 35 U.S.C. § 119, of German Patent Application DE 10 2021 200 642.6, filed Jan. 25, 2021; the prior application is herewith incorporated by reference in its entirety.

FIELD AND BACKGROUND OF THE INVENTION

The invention relates to a hearing device, in particular hearing aid, containing a transmitter circuit for wireless signal transmission. The invention furthermore relates to a method for operating such a hearing device.

Hearing aids are portable hearing devices (hearing instrument) that are used to provide support for persons who are hard of hearing or have a hearing impediment. In order to meet the numerous individual needs, different designs of hearing aids are provided, such as behind-the-ear hearing devices (BTE) and hearing devices with an external receiver (RIC: receiver in the canal) and also in-the-ear hearing devices (ITE), including for example concha hearing devices or channel hearing devices (ITE: In-The-Ear, CIC: Completely-In-Channel, IIC: Invisible-In-The-Channel). The hearing devices listed as examples are worn on the external ear or in the auditory canal of a hearing aid user. Furthermore, however, bone conduction hearing aids, implantable hearing aids or vibrotactile hearing aids are also available on the market. In these devices, impaired hearing is stimulated either mechanically or electrically.

In principle, such hearing devices have an input transducer, an amplifier and an output transducer as essential components. The input transducer is generally an acousto-electric transducer, such as a microphone, for example, and/or an electromagnetic receiver, for example an induction coil or a (radio-frequency, RF) antenna. The output transducer is usually realized as an electro-acoustic transducer, for example as a miniature loudspeaker (receiver), or as an electromechanical transducer, such as a bone conduction receiver, for example. The amplifier is usually integrated into a signal processing device. Energy is usually supplied by a battery or a rechargeable battery.

In the case of a so-called binaural hearing aid, two such hearing devices are worn by a user, there being a communication or signal connection between the hearing devices, this also being referred to as ear-to-ear (e2e) communication. In this case, during operation, data, possibly even large amounts of data, and/or audio signals are exchanged, for example wirelessly, between the hearing devices on the right and left ears. The data and information exchanged enable the hearing devices to be adapted particularly effectively to a respective acoustic environmental situation. In particular, this enables particularly authentic spatial acoustics for the user and improves the intelligibility of speech, even in noisy environments. Furthermore, features and functionalities such as narrow focus or CROS (Contralateral Routing Of Signal) are made possible, for example.

On account of the limited energy sources in a hearing device, it is necessary for the e2e signal transmission to be embodied in a manner that saves as much power as possible, in order to enable a battery life of several days with active e2e communication. In this case, e2e communication systems are typically realized as a magneto-inductive connection consisting of an analog and digital transmitter, two coils as transmitting and receiving antenna and an analog and digital receiver. A transmitter circuit of the communication system is critical here with regard to battery consumption.

In the course of signal transmission, a payload signal to be transmitted is regularly altered (modulated) with a so-called carrier, thereby enabling a low-frequency payload signal to be transmitted at high frequency. The payload signal or the data and information are recovered at the reception end by means of a corresponding demodulation. A constant envelope phase modulation technique is generally used as modulation format in the case of binaural hearing devices for energy saving reasons. Other transmitter topologies, such as e.g. IQ modulators, are not suitable for low-power hearing devices on account of the high power consumption.

The challenge in respect of design is to construct a power-saving transmitter which generates a signal with constant envelope phase modulation. On account of the limited structural space in the hearing device, it is necessary for the transmitter to be embodied as compactly as possible and in a manner allowing it to be integrated into a customized ASIC. In particular, the intention is to use the fewest possible external components. Furthermore, the transmission signal generated must comply with regulatory specifications (e.g. spectral masks).

Such a transmitter or transmitter circuit comprises a resonant circuit and an energy feed-in circuit, for example.

The different phases of the transmitter (TX) are realized by the transmission frequency being varied by means of a detuning of the resonant circuit for a specific time duration until a desired phase is attained. In this case, at least three different frequencies are used, firstly the nominal transmission frequency (f0), and secondly a frequency below the transmission frequency (fm) which is used for negative phase shifts, and also a frequency above the transmission frequency (fp) which is used for positive phase shifts. The transmission signal is a continuous signal with a constant envelope.

The energy feed-in circuit is embodied as an H-bridge circuit, for example. The energy feed-in circuit compensates for losses and feeds energy into the resonant circuit at an exact point in time in order to maintain the oscillation with constant amplitude and the desired frequency. In this case, the (feed-in) point in time is effected in a manner synchronized with the oscillation.

SUMMARY OF THE INVENTION

The invention is based on the object of specifying a particularly suitable hearing device. In particular, the intention is to realize particularly energy-saving and, in terms of structural space, compact e2e communication. The invention is furthermore based on the object of specifying a particularly suitable method for operating such a hearing device.

The object is achieved according to the invention by means of the features of the independent hearing device claim and by means of the features of the independent method claim. The dependent claims relate to advantageous configurations and developments. The advantages and configurations mentioned in relation to the hearing device are analogously also applicable to the method, and vice versa.

The hearing device is designed in particular as a hearing aid, and is preferably used to provide support for a user having a hearing impediment (hearing device user). In this case, the hearing device is designed to pick up sound signals from the environment and to output them to a user of the hearing device. For this purpose, the hearing device contains at least one acousto-electric input transducer, in particular a microphone, and also at least one electro-acoustic output transducer, for example a receiver. During operation of the hearing device, the input transducer picks up sound signals (noises, sounds, speech, etc.) from the environment and converts them into an electrical input signal (acoustic data). An electrical output signal is generated from the electrical input signal by the input signal being modified in a signal processing facility. The signal processing facility is part of the hearing device, for example. The input transducer and the output transducer and optionally the signal processing facility as well are accommodated in particular in a housing of the hearing device. The housing is designed in such a way that it can be worn by the user on the head and near the ear, e.g. in the ear, on the ear or behind the ear. The hearing device is preferably designed as a BTE hearing device, an ITO hearing device or an RIC hearing device.

The hearing device comprises a transmitter having a transmitter circuit for wireless signal transmission, in particular for e2e communication. The transmitter circuit contains an electrical resonant circuit having at least one controllable semiconductor switch and having at least one capacitor and also having a transmitter coil or transmission coil. According to the invention, the at least one semiconductor switch is driven by a pulse phase modulator. In other words, the transmitter circuit according to the invention is provided for a pulse phase modulation of an envelope of a transmission signal, and is also suitable and set up therefor. A particularly suitable hearing device is realized as a result.

In one suitable development, the resonant circuit comprises two capacitors and two controllable semiconductor switches, wherein a respective semiconductor switch is assigned to a capacitor, and wherein the transmitter coil is interconnected between the capacitors. As a result, the transmitter coil is driveable symmetrically via the capacitors and semiconductor switches.

In one advantageous embodiment, an output side of a bridge circuit is connected to the transmitter coil. In other words, the transmitter coil is interconnected between two bridge branches. In this case, the bridge circuit acts as a feed-in circuit provided for feeding loss energy (on account of parasitic losses or radiated power) into the resonant circuit in order to ensure a constant amplitude in the resonant circuit or of the transmission signal. The bridge circuit is preferably embodied as an H-bridge circuit.

In one expedient configuration, the pulse phase modulator and the bridge circuit are controlled with the aid of a common timer. In other words, the operating states of the bridge circuit and of the pulse phase modulator are derived from a common timer or clock generator. As a result, it is possible to suitably switch the pulse phase modulator and the bridge circuit while the resonant circuit operates in resonance at a desired transmission frequency, and without the monitoring of an actuating voltage in the capacitor or a current in the transmitter coil.

One additional or further aspect of the invention provides for the hearing device to be of binaural design and for this purpose to comprise two individual devices, which each comprise at least one input transducer and also at least one output transducer and are thereby designed to pick up sound signals from the environment and to output them to a user of the hearing device. In addition, each of the individual devices contains a transmitter circuit as a wireless interface for data exchange between the two individual devices. In this case, the individual devices are coupled or at least couplable to one another in terms of signaling via the transmitter circuits.

In the case of a binaural hearing device, the two individual devices are worn by the user on different sides of the head, such that each individual device is assigned to an ear. As an alternative to a binaural hearing device, however, a monaural hearing device having just one individual device is also suitable. The explanations regarding a monaural hearing device are analogously applicable to a binaural hearing device, and vice versa.

The method according to the invention is provided for operating a hearing device described above, and is also suitable and configured therefor. For wireless signal transmission a transmission signal (TX signal) is generated by the transmitter circuit, wherein according to the method the transmitter coil is disconnected from the or each capacitor at a first point in time, and wherein the transmitter coil is connected to the or each capacitor again at a later second point in time when a desired phase angle of the resonant circuit is attained. In other words, according to the method, the resonant circuit is halted or stopped at the first point in time and is started again at the second point in time, such that a phase offset of the resulting transmission signal is effected. It is thereby possible to switch over the transmitter circuit between different phases (TX phases).

The transmitter concept according to the invention thus modulates the phase of the transmission signal by the resonant circuit being paused for a time duration. The method has the advantage that a desired phase is attained almost immediately, but at least within a transmission cycle. In contrast thereto, a phase shift by means of frequency detuning of the resonant circuit in accordance with the prior art, depending on the desired phase step and the frequencies (fm, fp), requires a plurality of transmission cycles until a desired TX phase is attained.

Furthermore, a particularly cost-effective pulse phase modulator having a reduced complexity is thus made possible since only one frequency—the nominal transmission frequency (f0)—is transmitted. Further transmission frequencies (fm, fp) are no longer required according to the invention, as a result of which the transmitter circuit is simplified. Furthermore, a need for trimming these frequencies is obviated.

Insofar as method steps are described below, advantageous configurations for the hearing device arise in particular by virtue of said hearing device being designed to carry out one or more of said method steps. In particular, the hearing device preferably contains a controller (that is to say a control unit) coupled to the transmitter circuit. In this case, the controller can be part of a signal processing facility of the hearing device, for example.

In this case, the controller is configured generally—in terms of programming and/or circuitry—for carrying out the above-described method according to the invention. The controller is thus specifically configured to drive the pulse phase modulator and/or the semiconductor switches and also optionally the bridge circuit.

In one preferred configuration, the controller is at least essentially formed by a microcontroller with a processor and a data memory, in which the functionality for carrying out the method according to the invention is implemented in terms of programming in the form of operating software (firmware), such that the method—if appropriate in interaction with a device user—is carried out automatically upon the execution of the operating software in the microcontroller. Alternatively, however, in the context of the invention, the controller can also be formed by a non-programmable electronic component, such as an application-specific integrated circuit (ASIC), for example, in which the functionality for carrying out the method according to the invention is implemented with circuitry means.

In one advantageous development, the transmitter coil is disconnected from the or each capacitor when the or each capacitor is substantially fully charged. For a good power efficiency, the resonant circuit is stopped in particular when the current in the transmitter coil is zero and the charge in the capacitor has reached a positive maximum by virtue of the transmitter coil being disconnected from the capacitor.

Voltage spikes or unwanted artefacts in the transmission signal can occur on account of asymmetries in the transmitter circuit or a detuned resonant circuit. In order to avoid or suppress such unwanted effects, one expedient embodiment provides for the transmitter coil to be short-circuited when the transmitter coil is disconnected from the or each capacitor. The remaining energy in the transmitter coil is short-circuited as a result.

With the method according to the invention, a continuous transmission signal is not generated since the resonant circuit is stopped in the case of phase shifts. This leads to signal emissions outside a useful frequency band, too, which are typically higher than during continuous operation. In order to reduce these undesired emissions, one preferred embodiment of the method provides for the or each semiconductor switch to be driven with a control signal of the pulse phase modulator, wherein the control signal contains dither noise. In other words, provision is made of dithering for the driving of the semiconductor switches.

By way of example, the semiconductor switches are opened when the assigned capacitor has attained a positive or negative voltage maximum. As a result, two switching processes are realized during a sinusoidal transmission signal (sine wave) at 0° and 180°. For the restart, for a given TX phase it is therefore possible, for example, to choose the second point in time such that the TX phase starts with a positive half-cycle, or that the TX phase starts one half-cycle earlier in this regard, i.e. with a 180° earlier negative half-cycle, or that the TX phase starts one half-cycle later in this regard, i.e. with a 180° later negative half-cycle. In this case, the point in time of switching of the semiconductor switches is preferably changed randomly between these points in time (dithering). This has the advantage that undesired transmissions are significantly reduced and the length of the transmitted TX phase is equalized.

During operation, the pulse phase modulator generates, in the transmission signal generated, first-order sidelobes at f0±1.5 fs, wherein f0 is the carrier frequency and fs is the modulation symbol rate. If the symbol rate is chosen to be very high in order to increase the data rate of the radio link, it can happen that the sidelobes no longer lie within the permissible legal bandwidth limits, as a result of which they have to be damped to a sidelobe level that is predefined by an emission mask.

For wireless signal transmission in the case of a hearing device, reducing the sidelobes as simply as possible is desired in order to minimize the processing complexity and thus the power consumption. In one preferred configuration of the method, provision is made for the symbol rate of the transmission signal to be switched over between at least two symbol rate values. In other words, the symbol rate is not constant, but rather changes back and forth between two or more symbol rates. The transmission signal thus results from a superposition of the different symbol rates, as a result of which the sidelobes are suppressed. In this case, the switchover or changeover sequence between the symbol rates is stored for the signal transmission or e2e communication both at the transmitter end and at the receiver end.

Other features which are considered as characteristic for the invention are set forth in the appended claims.

Although the invention is illustrated and described herein as embodied in a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually corresponding parts and variables are always provided with the same reference signs in all of the figures.

Figure 1:
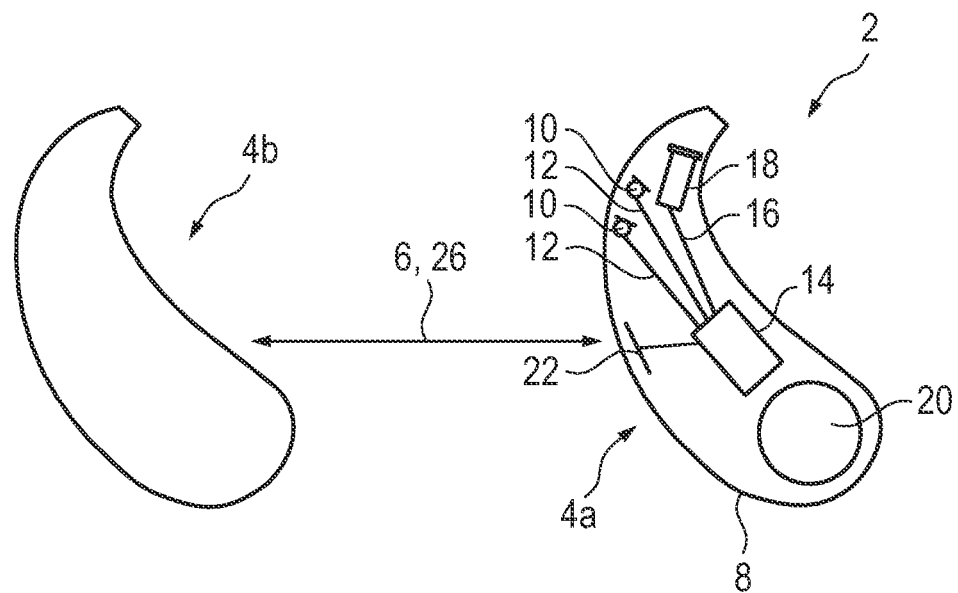
FIG. 1 is a schematic illustration showing a binaural hearing device.

Referring now to the figures of the drawings in detail and first, particularly to FIG. 1 thereof, there is shown the basic construction of a hearing device 2 according to the invention. In this exemplary embodiment, the hearing device 2 is embodied as a binaural hearing aid containing two hearing aid devices or individual devices 4a, 4b coupled in terms of signaling. In this case, the individual devices 4a, 4b are configured for example as behind-the-ear hearing aid devices (BTE). The individual devices 4a, 4b are coupled or couplable to each other in terms of signaling by means of a wireless signal connection or e2e communication 6.

The construction of the individual devices 4a, 4b is explained below by way of example on the basis of the individual device 4a. As illustrated schematically in FIG. 1, the individual device 4a contains a device housing 8, in which one or more microphones, also referred to as acousto-electric input transducers 10, are installed. The input transducers 10 pick up a sound or the acoustic signals in an environment of the hearing device 2 and convert same into an electrical audio signal or acoustic data.

The acoustic data are transmitted via lines 12 to a signal processing facility 14, which is likewise arranged in the device housing 10 and which processes the acoustic data. On the basis of the audio signal, the signal processing facility 14 generates an output signal, which is routed to a loudspeaker or receiver 18 via a line 16. In this case, the receiver 18 is embodied as an electro-acoustic output transducer, which converts the electrical output signal into an acoustic signal. In the case of the BTE individual device 4*a*, the acoustic signal is transmitted to the eardrum of a hearing device user optionally via a sound tube or external receiver, not illustrated in more specific detail, which is connected to an earmold fitted in the auditory canal. However, an electromechanical output transducer as receiver 18 is also conceivable, for example, as in the case of a bone conduction receiver, for example.

Energy is supplied to the individual device 4*a* and in particular to the signal processing facility 14 by means of a battery 20 accommodated in the device housing 8.

The signal connection 6 is embodied for example as a magneto-inductive couple between the individual devices 4*a* and 4*b*. For this purpose, the signal processing facility 14 is linked to a transmitter 22 in terms of signaling. The transmitter 22 serves for transmitting wireless signals by means of the signal connection 6.

The transmitter 22 contains a transmitter circuit 24 for generating a transmission signal 26 communicated via the signal connection 6, which transmitter circuit will be explained in greater detail below with reference to FIGS. 2 and 3.

Figure 2:
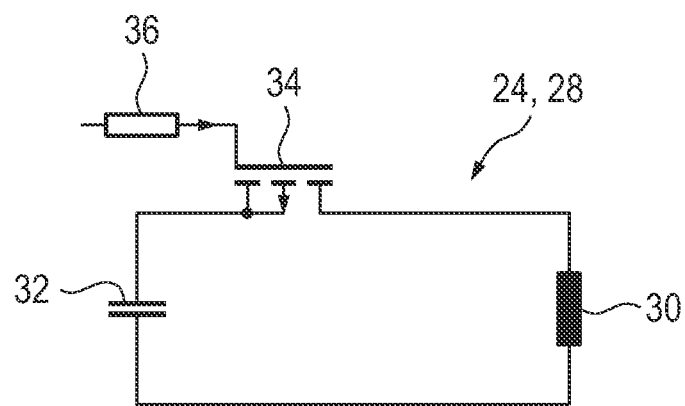
FIG. 2 is a block diagram showing a simplified resonant circuit of a transmitter circuit.

FIG. 2 shows a schematically simplified illustration of an electrical resonant circuit 28 of the transmitter circuit 24. The resonant circuit 28 is embodied in particular as a parallel resonant circuit and in this case contains a transmitter coil or transmission coil 30 and a capacitator 32 and also a semiconductor switch 34 embodied as a transistor, in particular as a MOSFET (metal oxide semiconductor field effect transistor). In this case, the semiconductor switch 34 is driven by a pulse phase modulator 36.

Figure 3:
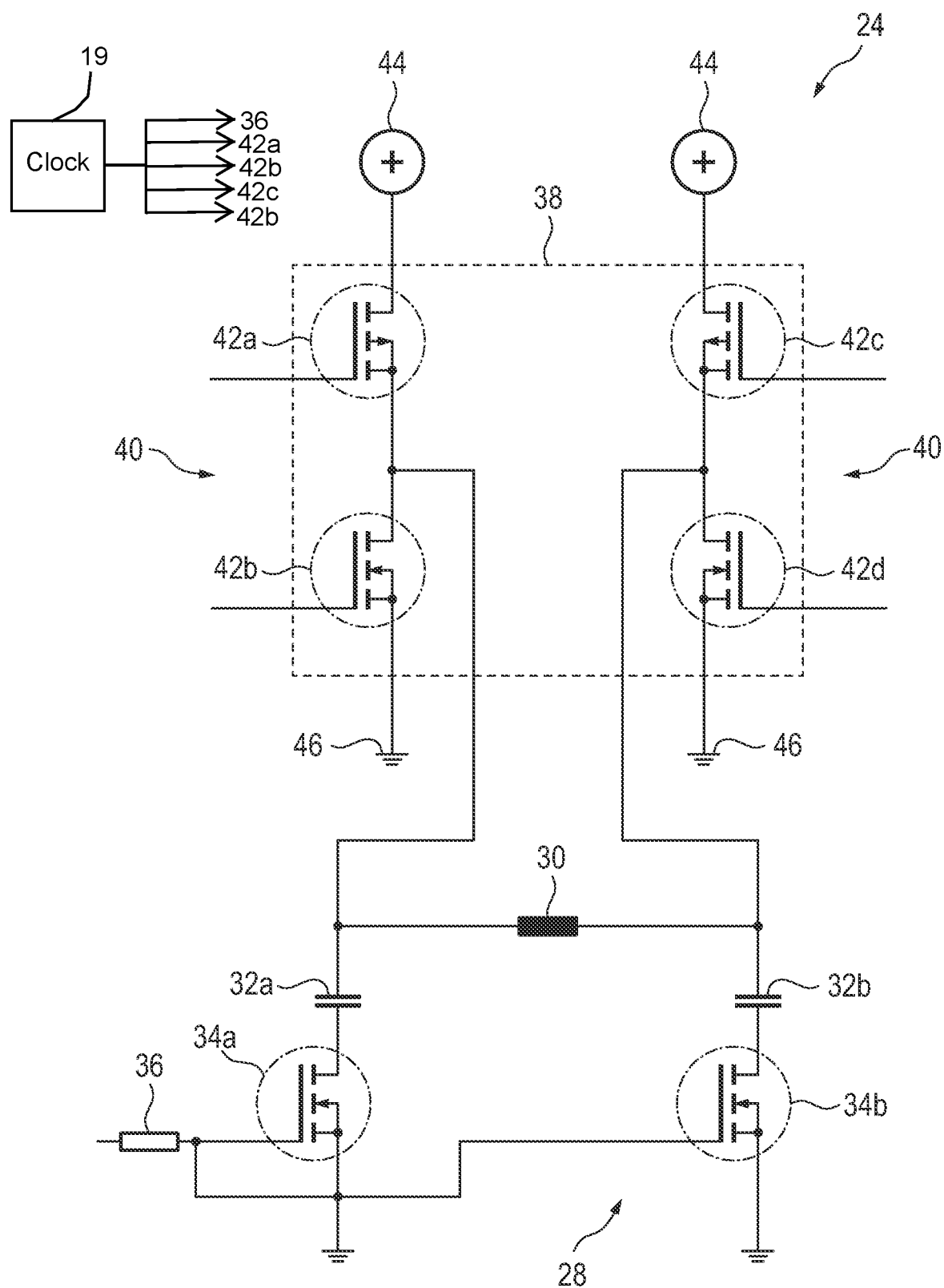
FIG. 3 is a block diagram showing a transmitter circuit.

FIG. 3 shows the transmitter circuit 24. In this case, the resonant circuit 28 contains two capacitors 32*a*, 32*b* and two semiconductor switches 34*a*, 34*b*. In this case, the terminals of the transmitter coil 30 are contacted via a respective capacitor 32*a*, 32*b*, wherein the capacitors 32*a*, 32*b* are respectively assigned one of the semiconductor switches 34*a*, 34*b*. The semiconductor switches 34*a*, 34*b* are jointly driven by the pulse phase modulator 36, and are thus switched substantially simultaneously. The terminals of the transmitter coil 30 are furthermore connected to a bridge circuit 38 connected in parallel with the resonant circuit 28.

The bridge circuit 38 is embodied as an H-bridge circuit having two bridge branches 40 each have two semiconductor switches 42*a*, 42*b*, 42*c*, 42*d*. In this case, the semiconductor switches 42*a*, 42*b*, 42*c*, 42*d* are driven in a pulse-width-modulated manner. At one end in each case the bridge branches 40 are connected to a supply voltage by way of a potential terminal 44. At the other end the bridge branches 40 are contacted with a ground potential by way of a second potential terminal 46. Via the semiconductor switches 42*a*, 42*b*, 42*c*, 42*d* the respective coil end of the transmitter coil 30 is connectable either to the supply voltage or to the ground potential. By way of example, if the semiconductor switch 42*a* is closed (conducting) and the semiconductor switch 42*b* is opened (nonconducting), then the coil end coupled to the capacitor 32*a* is connected to the potential of the supply voltage. Correspondingly, in the event of the semiconductor switch 42*b* being opened and the semiconductor switch 42*a* being closed, the transmitter coil 30 is contacted with the ground potential.

The bridge circuit 38 is provided and set up for feeding loss energy (on account of parasitic losses or radiated power) into the resonant circuit 28 during operation of the transmitter 22, in order to obtain a constant amplitude in the resonant circuit 28—and thus a constant amplitude of the transmission signal 26.

By means of the semiconductor switches 34*a*, 34*b*, the resonant circuit 28 is started and halted or stopped. In this case, a switch-off time of the semiconductor switches 34*a*, 34*b* which is as accurate as possible is critical for the operation of the transmitter circuit 24. The semiconductor switches 34*a*, 34*b* are suitably opened when the entire energy of the resonant circuit 28 is stored in the capacitors 32*a*, 32*b* and there is no residual energy in the transmitter coil 30. This ensures that the transmitter circuit 24 is operated with as maximal an efficiency as possible since any residual energy in the transmitter coil 30 would be lost upon the opening of the semiconductor switches 34*a*, 34*b*. Consequently, voltage spikes at the transmitter coil 30 (self-induction) are thus avoided, which voltage spikes could lead to undesired transmissions or even to the destruction of the transmitter circuit 24. These effects cannot be completely avoided, however, on account of possible asymmetries in the transmitter circuit 24 or on account of a detuned resonant circuit 28. The transmitter coil 30 is therefore short-circuited when the semiconductor switches 34*a*, 34*b* are open in order that the energy remaining in the transmitter coil 30 is short-circuited. The short-circuiting is effected either by means of a separate switch or by means of corresponding driving of the bridge circuit 38, for example by means of an activation of the semiconductor switches 42*b* and 42*d* when the semiconductor switches 34*a* and 34*b* are open.

Preferably, the operating or switching states of the bridge circuit 38 and of the pulse phase modulator 36 are derived from a common clock generator or timer 19. This ensures synchronized switching of the semiconductor switches 34*a*, 34*b*, 42*a*, 42*b*, 42*c*, 42*d*. Correct points in time of switching are thus ensured, such that the resonant circuit 28 can operate in resonance at a desired transmission frequency f0 without the need to monitor an actuating voltage in the capacitors 32*a*, 32*b* or a coil current Is in the transmitter coil 30. As a result, additional ammeters and/or voltmeters are obviated, thereby ensuring a simple, cost-effective and, in terms of structural space, compact construction of the transmitter circuit 24.

Figure 4:
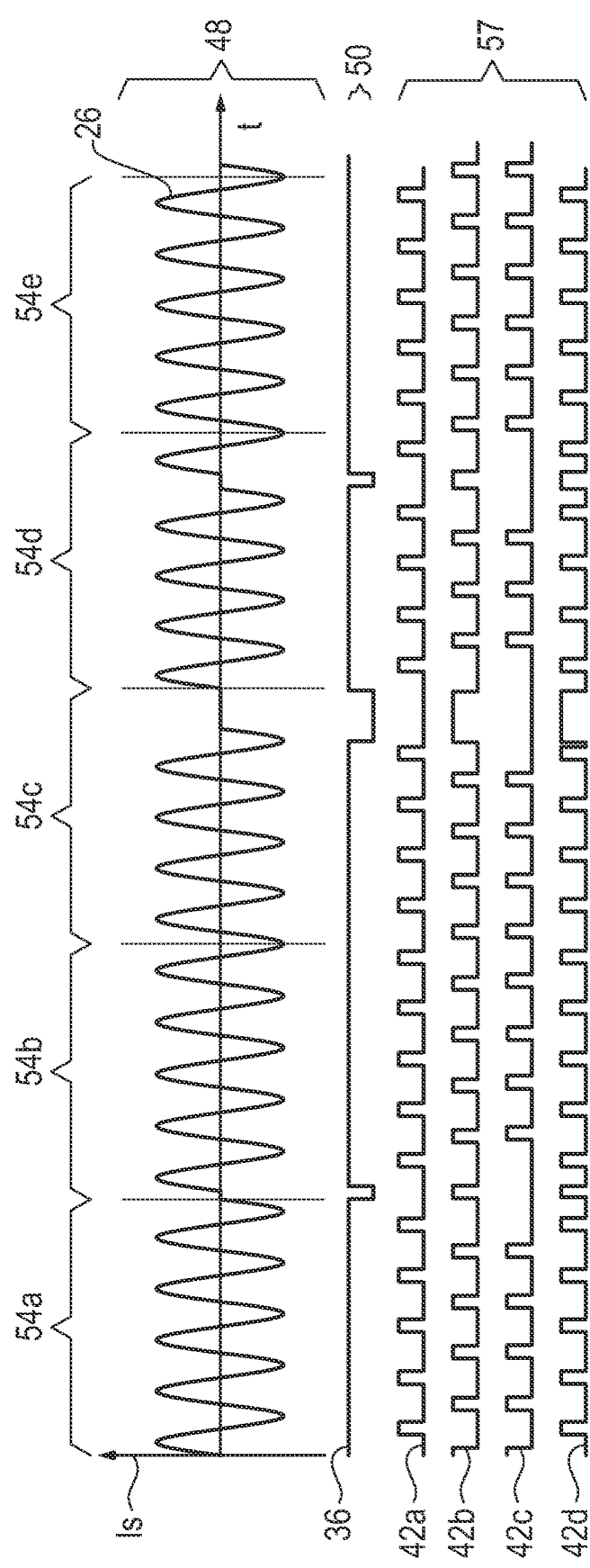
FIG. 4 is an illustration showing a pulse phase modulation of a transmission signal of the transmitter circuit in one time-coil current diagram formed from five switching pulse diagrams.

The diagram in FIG. 4 contains three sections 48, 50, 52 arranged vertically one above another.

The section 48 shows a schematic time-coil current diagram, wherein time t is plotted horizontally, i.e. along the abscissa axis (X-axis), and the coil current Is of the transmitter coil 30 is plotted along the vertical ordinate axis (Y-axis).

The section 50 shows the profile of a control signal of the pulse phase modulator 36 for the semiconductor switches 34*a*, 34*b*, with the section 52 showing the control signals for the semiconductor switches 42*a*, 42*b*, 42*c*, 42*d*. A high signal level of the control signals closes the respective semiconductor switch 34*a*, 34*b*, 42*a*, 42*b*, 42*c*, 42*d*, i.e. switches it to the conducting state, a low signal level of the control signal corresponding to opening the respective semiconductor switch 34*a*, 34*b*, 42*a*, 42*b*, 42*c*, 42*d*, i.e. switching it to the nonconducting state. In this case, the semiconductor switches 42*a* and 42*c* are opened and the semiconductor switches 42*b* and 42*d* are closed, while the semiconductor switches 34*a*, 34*b* are open in order that the transmitter coil 30 is short-circuited.

The section 48 schematically shows a modulation according to the invention of the transmission signal 26. In this case, the transmission signal 26 is shown as a sinusoidal signal. The section 48 shows five transmitter patterns (TX sample) 54a, 54b, 54c, 54d, 54e for realizing different modulation phases. By way of example, in this case, provision is made of five sine waves per transmitter pattern 54a, 54b, 54c, 54d, 54e, with one sine wave being omitted in the case of positive phase shifts (rotating in the counterclockwise direction), which results in four sine waves in these cases.

In the case of the transmitter pattern 54a, a modulation phase of 0° is present, the transmission signal 26 having five sine waves. In the transmitter pattern 54b, a phase shift of −90° is present, in which case the phase modulator 36 opens the semiconductor switches 34a, 34b in order to momentarily stop or pause the resonant circuit 28 until the desired phase angle of the sinusoidal signal is present. The subsequent transmitter pattern 54c likewise has a phase shift of −90°, but only four sine waves with a pause corresponding to a +90° phase shift are provided in order to realize again a phase angle or phase shift of 0° (relative to the transmitter pattern 54a) in the transmitter pattern 54d. During the transmitter pattern 54d, the resonant circuit 28 is paused in order to realize a phase shift of +135° for the transmitter pattern 54e. Since the phase +135° is transmitted in the case of the transmitter pattern 54e, it is necessary for the sinusoidal oscillation to be started before the actual symbol limit in order to attain a phase of 135°. In this case, the fourth transmitter pattern 54d has only four sine waves (sine waves with phase of 0°).

The pulse phase modulator 36 has the disadvantage that there is no continuous TX signal since it has to be halted or stopped in the case of phase shifts. This causes signal emissions outside a desired frequency band, too, which are typically higher than in the case of continuous operation. In order to reduce these undesired emissions, switching dithering is provided.

Figure 5:
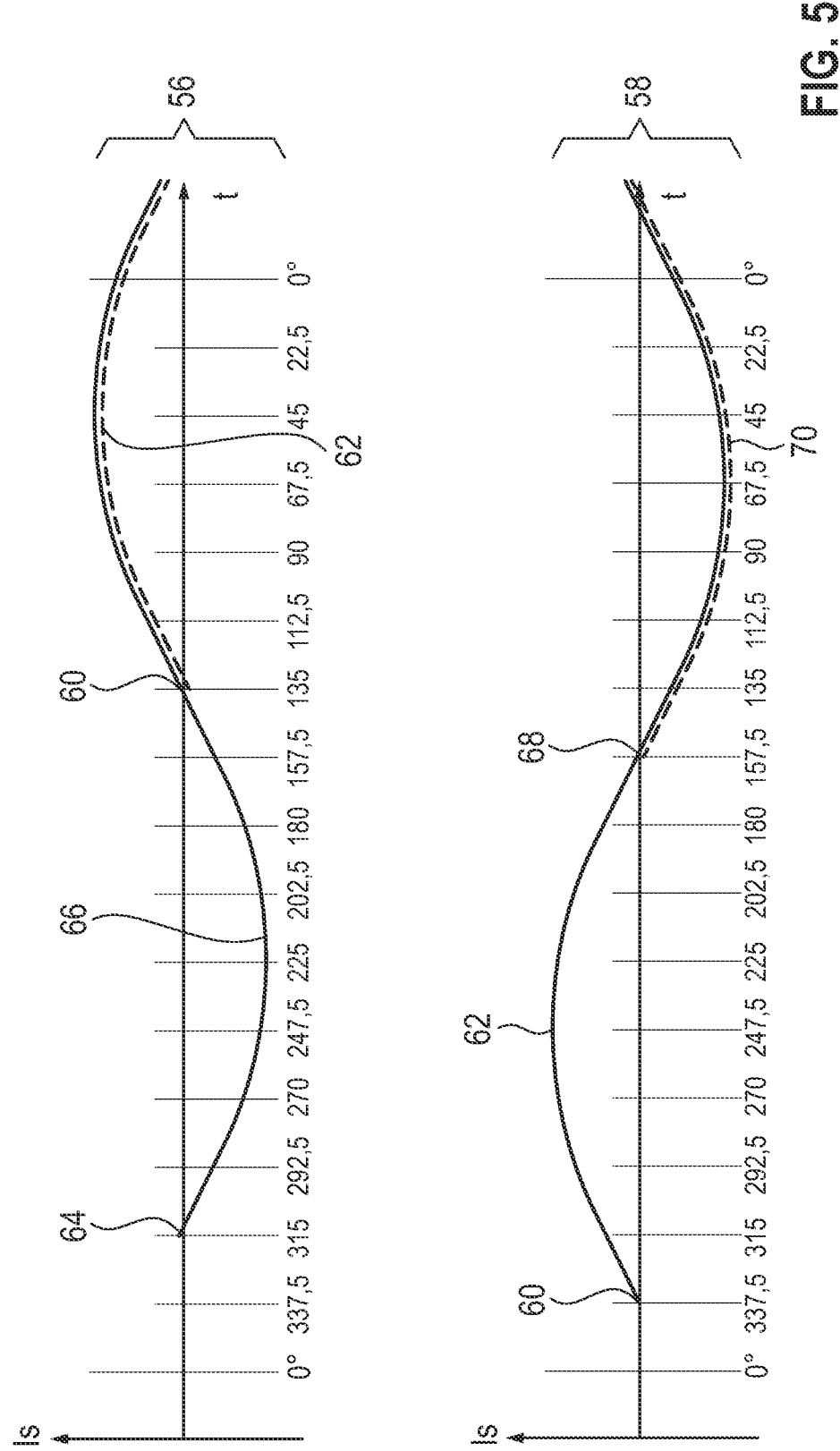
FIG. 5 shows switching dithering in two time-coil current diagrams.

With reference to FIG. 5, a more detailed explanation is given below of switching dithering of the pulse phase modulator 36, wherein the drive signals for the semiconductor switches 34a, 34b are provided with dithering noise.

The diagram in FIG. 5 comprises two sections 56, 58 arranged vertically one above the other. Sections 56, 58 each show a schematic time-coil current diagram, wherein time t is plotted horizontally, i.e. along the abscissa axis (X-axis), and the coil current Is of the transmitter coil 30 is plotted along the vertical ordinate axis (Y-axis). In this case, the time axis is subdivided into phase angles.

In this case, the semiconductor switches 34a, 34b are opened when the capacitors 32a, 32b attain a positive or negative voltage maximum, which corresponds to two switching processes during a sine wave at 0° and 180°. In the differential construction of the transmitter circuit 24, the charge in this case is exchanged between the two capacitors. Here and hereinafter, a switching position at 0° should be understood to mean in particular the state when the capacitor 32a has maximum voltage (the complete charge) and the other capacitor 32b has no voltage. The other point in time of switching at 180° is correspondingly the opposite, when the capacitor 32b has maximum voltage and the capacitor 32a has no voltage.

Overall, therefore, three different positions are possible for the restart of the resonant circuit 28 for a predefined TX phase.

First, a start in the case of a desired TX phase with a positive half-cycle. This point in time is provided with the reference sign 60 in FIG. 4. In the section 56, the point in time 60 corresponds to a TX phase of 135°, with a TX phase of 337.5° being chosen in the section 58. The resulting signal profile is provided with the reference sign 62 in the figures.

As a second start position, a start with one half-cycle earlier than at the point in time 60, i.e. a start with a negative half-cycle but 180° earlier phase angle, is possible. This variant is shown in the section 56, in the case of which variant the resonant circuit 28 is started at an earlier point in time 62, thus resulting in a signal profile 66. As of the point in time 60 the signal profiles 62 and 66 have the same temporal profile.

As a third start position, a start with one half-cycle later than at the point in time 60, i.e. a start with a negative half-cycle but 180° later phase angle, is possible. This variant is shown in the section 58, in the case of which variant the resonant circuit 28 is started at a later point in time 68, thus resulting in a signal profile 70. As of the point in time 68 the signal profiles 62 and 66 have the same temporal profile. The switch-off point in time is suitably chosen according to the planned start position. For a start with a positive half-cycle 0° it is necessary for the resonant circuit 28 to be stopped previously such that all charge is stored in one of the capacitors 32a, 32b, for example in the capacitor 32a. For a start with a negative half-cycle 180° it is accordingly necessary for the resonant circuit 28 to be stopped such that the charge is stored in the respective other capacitor, i.e. the capacitor 32b, for example, in order that the coil current Is can start with a negative half-cycle.

Preference is given to changing over randomly between these three start or switching positions, as a result of which undesired transmissions are significantly reduced and the length of the transmitted phases is equalized. This dithering or dither noise is able to be realized by means of the following pseudocode, for example:

i) if (rand>0.5):
ii) if (txPhase>180°)
iii) startPosition=Dither_neg_late;
iv) else
v) startPosition=Dither_neg_early;
vi) end
vii) else
viii) startPosition=Default_pos;
ix) end In this case, rand is a random number between zero (0) and one (1), wherein txPhase is the transceiver phase in a range of between 0° and 360°. The switching position is designated by startPosition, where the start position without a delay with a positive half-cycle is designated as Default_pos, and the start position with 180° earlier negative half-cycle is designated as Dither_neg_early, and the start position with 180° later negative half-cycle is designated as Dither_neg_late.

In addition or as an alternative to switching dithering, phase polarity dithering is also conceivable, for example. In this case, the switch-off periods are shortened by the resonant circuit 28 being restarted with a phase offset of 0° or 180°. The resonant circuit is preferably started with 0° or 180°, irrespective of whether it was stopped previously at 0° or 180°. The polarity dithering thus differs from the exemplary embodiment described above in particular to the effect that the exemplary embodiment described above has to be switched off at 0° in order also to be able to be switched on again at 0°. In the case of this refinement by means of an additional H-bridge, it is possible to switch off at 180° but to switch on again at 0° (and vice versa) which shortens the switch-off periods. Furthermore, spectrum emissions are reduced and the transmitted energy is increased. In this case, the additional H-bridge connected between the capacitors 32a, 32b and the transmitter coil 30 enables a rotation or inversion of the polarity of the coil current Is, which enables a restart of the resonant circuit 28 with opposite polarity, i.e. a phase offset of 180°. As a result, the maximum possible gap or pause of the stopped resonant circuit 28 decreases from one full sine wave down to half a sine wave.

A further aspect of the pulse phase modulator 36 presented is the possibility of realizing 1-bit amplitude control. In this case, the resonant circuit 28 is stopped for example not just until the desired TX phase is attained, but also for a longer period of time that enables a "transmission" amplitude of the transmission signal 26 of zero. The transmission spectrum can be improved further as a result. Furthermore, the performance of the entire communication system of the hearing device 2 is also improved, e.g. with the use of PSK transmitters (PSK: Phase Shift Keying).

Reducing interference emissions of the transmission signal 26 by means of a superposition of a plurality of symbol rates is explained in greater detail below with reference to FIGS. 6 to 8.

Figure 6:
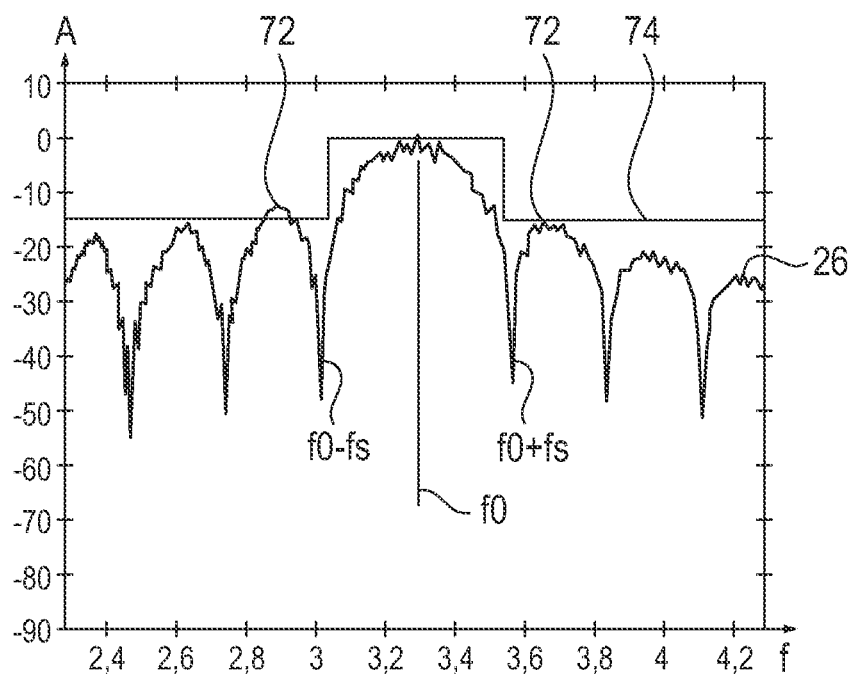
FIG. 6 is a frequency-amplitude diagram showing a spectrum of the transmission signal.
Figure 7:
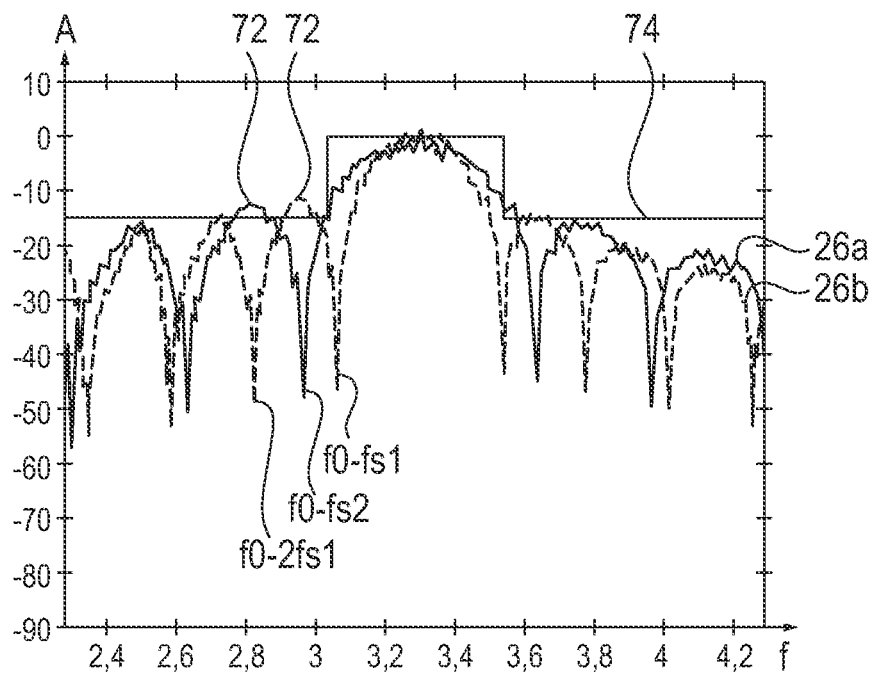
FIG. 7 is a frequency-amplitude diagram showing a spectrum for two different symbol rates.
Figure 8:
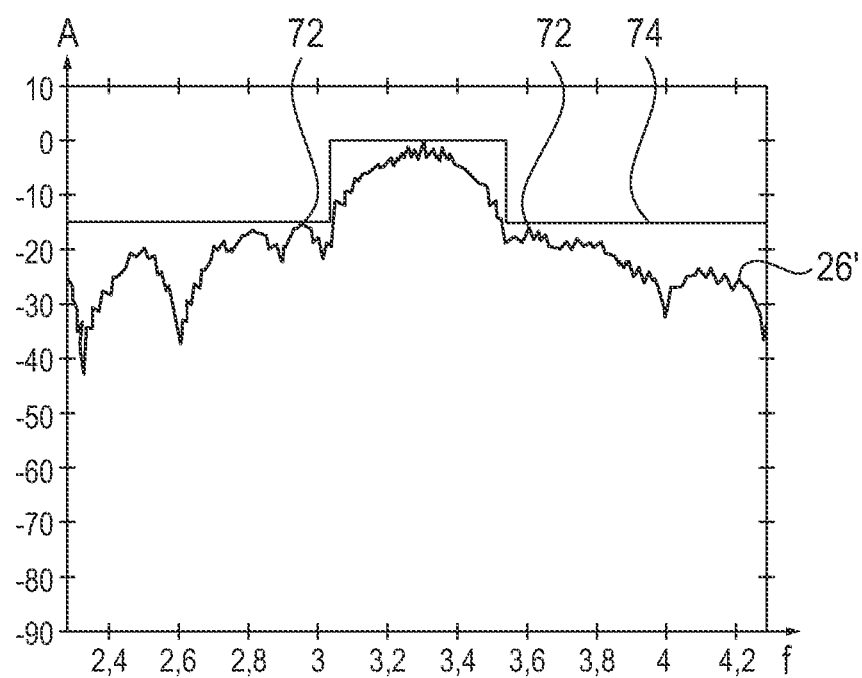
FIG. 8 is a frequency-amplitude diagram showing a spectrum of the transmission signal resulting from the two superposed symbol rates.

FIGS. 6 to 8 each show a frequency-amplitude diagram for a Fourier-transformed transmission signal 26. In this case, a frequency f in megahertz (MHz), is plotted horizontally, i.e. along the abscissa axis (X-axis), and a normalized amplitude A of a Fast Fourier Transform (FFT) in decibels (dB) is plotted along the vertical ordinate axis (Y-axis).

During operation, the pulse phase modulator 36 generates relatively high first-order sidelobes 72 at f0±1.5 fs, wherein f0 is the carrier frequency or transmission frequency and fs is the symbol rate of the modulation. If the symbol rate fs is chosen to be very high in order to increase the data rate of the radio link, it can happen that the sidelobes 72 no longer lie within permissible legal bandwidth limits, and must therefore be damped to a signal level that is predefined by an emission mask 74.

FIG. 6 shows one example of the contravention of the emission mask 74 according to the European standard ETSI EN 300 330 V2.1.1. The allowed modulation in this case must lie within the bandwidth of ±7.5%×f0, and the interference emission level to the left and right thereof in this case must be damped by approximately 15 dB.

In order to reduce the interference emissions, provision is made for the symbol rate fs of the transmission signal 26 to be switched over between at least two symbol rate values fs1, fs2. In other words, the symbol rate fs of the transmission signal 26 is not constant, but rather changes back and forth between two or more symbol rates fs1, fs2. This effectively results in two transmission signals 26a, 26b. In FIG. 7, the symbol rate fs1 is slightly less than the symbol rate fs, with the symbol rate fs2 being slightly greater than the symbol rate fs. Preferably, the symbol rates fs1, fs2 differ from the transmission frequency f0 by 20% or less in this case. In the exemplary embodiment, the transmission frequency is approximately 3.28 MHz (megahertz), with the symbol rate fs being approximately 281 kHz (kilohertz), the symbol rate fs1 being approximately 234 kHz, and the symbol rate fs2 being approximately 328 kHz. The symbol rate fs1 is thus approximately 17% greater than fs, with the symbol rate fs2 being correspondingly approximately 17% less than fs.

In the case where the symbol rates fs1, fs2 are switched over frequently or rapidly, the emission spectra 26a, 26b are smeared to form a combined spectrum 26' that no longer contravenes the prescribed emission mask 74. FIG. 8 shows the resulting spectrum or transmission signal 26' resulting from the superposition of the different symbol rates fs1, fs2 or transmission signals 26a, 26b. The superposition of the different symbol rates fs1, fs2 suppresses the sidelobes 72. In this case, the switchover or changeover sequence between the symbol rates f1, f2 is stored for the signal connection 6 or e2e communication both at the transmitter end and at the receiver end.

The invention is not restricted to the exemplary embodiments described above. Rather, other variants of the invention can also be derived therefrom by the person skilled in the art without departing from the subject matter of the invention. In particular, furthermore, all individual features described in association with the exemplary embodiments are also combinable with one another in a different way, without departing from the subject matter of the invention.

The following is a summary list of reference numerals and the corresponding structure used in the above description of the invention:

2 Hearing device
4a, 4b Individual device
6 Signal connection
8 Device housing
10 Input transducer
12 Lines
14 Signal processing facility
16 Line
18 Receiver
20 Battery
22 Transmitter
24 Transmitter circuit
26, 26a, 26b, 26' Transmission signal
28 Resonant circuit
30 Transmitter coil
32, 32a, 32b Capacitor
34, 34a, 34b Semiconductor switch
36 Pulse phase modulator
38 Bridge circuit
40 Bridge branch
42a, 42b, 42c, 42d Semiconductor switch
44, 46 Potential terminal
48, 50, 52 Section
54a, 54b, 54c, 54d, 54e Transmitter pattern
56, 58 Section
60 Point in time
62 Signal profile
64 Point in time
66 Signal profile
68 Point in time
70 Signal profile
72 Sidelobe
74 Emission mask
f0 Transmission frequency
Is Coil current
t Time
f Frequency
fs, fs1, fs2 Symbol rate

The invention claimed is:
1. A hearing device, comprising:
a transmitter circuit for wireless signal transmission, said transmitter circuit having an electrical resonant circuit with at least one controllable semiconductor switch, at least one capacitor connected to said at least one controllable semiconductor switch, a pulse phase modulator connected to said at least one controllable semiconductor switch, and a transmitter coil connected to said at least one capacitor, said at least one controllable semiconductor switch being driven by said pulse phase modulator.

2. The hearing device according to claim 1, wherein:
said electrical resonant circuit contains two capacitors and two controllable semiconductor switches, wherein a respective one of said controllable semiconductor switches is assigned to one of said capacitors; and
said transmitter coil is interconnected between said capacitors.

3. The hearing device according to claim 1, further comprising a bridge circuit, said transmitter coil is connected to said bridge circuit.

4. The hearing device according to claim 3, further comprising a common timer, said pulse phase modulator and said bridge circuit are controlled with an aid of said common timer.

5. The hearing device according to claim 3, wherein said bridge circuit is an H-bridge circuit.

6. The hearing device according to claim 1, wherein the hearing device is of binaural design and contains two individual devices, wherein each of said individual devices contains said transmitter circuit, and wherein said individual devices are coupled or couplable in terms of signaling via said transmitter circuit.

7. The hearing device according to claim 1, wherein the hearing device is a hearing aid.

8. A method for operating a hearing device having a transmitter circuit for wireless signal transmission, the transmitter circuit having an electrical resonant circuit with at least one controllable semiconductor switch, at least one capacitor connected to the at least one controllable semiconductor switch, a pulse phase modulator connected to the at least one controllable semiconductor switch, and a transmitter coil connected to the at least one capacitor, the at least one controllable semiconductor switch being driven by the pulse phase modulator, which comprises the steps of:
generating via the transmitter circuit a transmission signal for a wireless signal transmission;
disconnecting the transmitter coil from the at least one capacitor at a first point in time; and
connecting the transmitter coil to the at least one capacitor again at a later second point in time when a desired phase angle of the electrical resonant circuit is attained.

9. The method according to claim 8, which further comprises disconnecting the transmitter coil from the at least one capacitor when the at least one capacitor is substantially fully charged.

10. The method according to claim 9, wherein the transmitter coil is short-circuited when the transmitter coil is disconnected from the at least one capacitor.

11. The method according to claim 8, which further comprises driving the at least one controllable semiconductor switch with a control signal of the pulse phase modulator, wherein the control signal contains dither noise.

12. The method according to claim 8, which further comprises switching over a symbol rate of the transmission signal between at least two symbol rate values.

* * * * *